(12) United States Patent
Yamashita et al.

(10) Patent No.: US 6,596,793 B2
(45) Date of Patent: Jul. 22, 2003

(54) COPOLYMER EXCELLING IN PIGMENT DISPERSIBILITY

(75) Inventors: Fumio Yamashita, Yokohama (JP); Yoshiyuki Yukawa, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 139 days.

(21) Appl. No.: 09/879,125

(22) Filed: Jun. 13, 2001

(65) Prior Publication Data
US 2002/0019472 A1 Feb. 14, 2002

(30) Foreign Application Priority Data
Jun. 13, 2000 (JP) ........................................ 2000-176353

(51) Int. Cl.$^7$ ............................. C08K 5/34; C08K 3/18; C08K 3/22; C08F 20/06; C08F 20/10
(52) U.S. Cl. ...................... 524/99; 524/430; 524/451; 524/495; 526/317.1; 526/318.4
(58) Field of Search ........................... 524/99, 430, 451, 524/495; 526/317.1, 318.4

(56) References Cited

U.S. PATENT DOCUMENTS 5,244,979 A * 9/1993 Yamamoto et al. ...... 525/329.7

* cited by examiner

*Primary Examiner*—Kriellion A. Sanders
(74) *Attorney, Agent, or Firm*—Wenderoth, Lind & Ponack, L.L.P.

(57) ABSTRACT

This invention provides a copolymer having a number-average molecular weight within a range of 2,000–100,000 and a resin acid value within a range of 10–200 mgKOH/g, which is obtained by copolymerizing (a) 5–50 parts by weight of carboxyl-containing, polymerizable unsaturated macromonomer, (b) 30–70 parts by weight of at least one polymerizable unsaturated macromonomer selected from polyalkyl (meth)acrylate macromonomers and polystyrene macromonomers, and (c) 5–65 parts by weight of at least one other polymerizable unsaturated monomer which is copolymerizable with said (a) and/or (b) component; a pigment dispersion using this copolymer; and a pigment composition using this pigment dispersion.

14 Claims, No Drawings

1

COPOLYMER EXCELLING IN PIGMENT DISPERSIBILITY

BACKGROUND OF THE INVENTION

1. Field of the Invention

This invention relates to a copolymer excelling in dispersing ability of pigments, in particular, dispersibility of organic pigment such as diketopyrrolopyrrole; to a pigment dispersion in which said copolymer is used; and to a paint composition containing said pigment dispersion, which excels in stable color development.

2. Description of the Invention

Pigment dispersion pastes which are formed by dispersing pigment in a mixture of a dispersing resin, solvent and if necessary a dispersion promotor, have been widely used for paints and inks for coloring. In the field of paints and inks, social needs require further improvements in such properties as color developing ability and sharpness with increasing keenness, in addition to better performance of the paint film or printed matter per s. To meet the requirements, various organic pigments such as phthalocyanine pigments, quinacridone pigments, diketopyrrolopyrrole pigments and the like have been developed.

Whereas, even when a new pigment having excellent color developing property or sharpness meeting the social demands is developed, a dispersing resin and dispersion promotor matching the pigment must be used for preparing a dispersion showing the original innate color of the same pigment. The pigment dispersion, furthermore, must have sufficient stability to prevent reagglomeration of pigment particles, when it is used in a paint or ink. Hence, proposals have been made to develop dispersing resins and/or dispersion promotors which exhibit excellent pigment dispersibility, capacity for drawing forth the maximum color developing property of the available pigment and also excellent pigment dispersing stability to effectively inhibit re-agglomeration of the pigment particles in the formed pigment dispersion.

Such past proposals include, for example, (1) method of using a lubricant such as nonionic, cationic or anionic surfactant as the dispersion promotor (cf U.K. Patent Nos. 1108261 and 1159252), (2) method of using a pigment derivative as the dispersion promotor, which is mixed with a pigment to disperse the latter [cf. Sho 51(1976)-18736A1-JP], (3) method of using a nitrogen-containing compound as the dispersion promoter and a polyester oligomer as the dispersing resin, to improve dispersibility of the pigment and stability of the pigment dispersion by utilizing the affinity between the polyester oligomer and the nitrogen-containing compound [cf. Sho 58(1983)-145762A1-JP], (4) method of using a pigment dispersing agent comprising a component to form a steric repelling layer composed of a pigment-adsorbing component having nitrogen-containing substituent groups and polyester resin [cf. Hei 4(1992)-352882A1-JP] and (5) a method of using a copolymer which is obtained from a monomer having tertiary amino group and/or quaternary ammonium base and a polyalkyl (meth)acrylate macromonomer having a (meth)acryloyl group at its terminal [cf. Hei 8(1996)-253540A1-JP].

Where the dispersion promoter in the above method (1) is used, however, the adsorption layer adsorbed onto the particle surfaces is too thin to exhibit satisfactory stabilization effect, and no appreciable improvement in pigment dispersibility is achieved. In the above method (2), the pigment derivatives used are themselves essentially colored, and hence this method cannot be generally used for all pigments. In the method (3), the polyester oligomer used therein has poor compatibility with acrylic resins which are of particular importance as resins for paint. In consequence, it is difficult for this method to attain in acrylic resin-derived paints the color developing property inherent in individual pigments. Furthermore, although the methods (4) and (5) introduced a steric repelling component, adsorption of the dispersant onto pigment is insufficient and stability of pigment dispersion is unsatisfactory. In particular, in the occasion of dispersing diketopyrrolopyrrole pigments, the insufficient adsorption of the dispersant onto the pigments causes notably inferior color developing property and dispersing stability. An attempt was made to give a surface treatment to the pigment with the view to improve said defect, which, however, achieved neither any substantial improvement in dispersing stability of the pigment nor full exhibition of innate color-developing property. Where the pigment concentration was high, furthermore, troubles were caused by the surface treating agent of the pigment.

Thus, the main object of the present invention is to provide a pigment dispersion which excels in dispersibility and dispersion stability of a broad range of pigments, in particular, in those of difficulty dispersible pigments such as diketopyrrolopyrrole pigments, and is capable of drawing forth the innate color developing ability of individual pigments; dispersing resin useful for preparation of such a pigment dispersion; and also a paint composition using the pigment dispersion, which excels in color developing ability and appearance of the coat film.

SUMMARY OF THE INVENTION

This invention provides a copolymer which is characterized in that said copolymer is obtained through copolymerization of (a) carboxyl-containing, polymerizable unsaturated macromonomer 5–50 parts by weight, (b) at least one polymerizable unsaturated macromonomer selected from polyalkyl (meth)acrylate macromonomers and polystyrene macromonomers 30–70 parts by weight, and (c) at least one other polymerizable unsaturated monomer which is co-polymerizable with above (a) and/or (b) component 5–65 parts by weight, said copolymer having a number-average molecular weight within a range of 2,000–100,000 and a resin acid value within a range of 10–200 mgKOH/g.

The invention also provides a pigment dispersion which contains said copolymer, pigment, organic solvent and optionally a dispersion promotor.

The invention furthermore provides a paint composition containing said paint dispersion.

Hereinafter the invention is explained in further details.

DETAILED DESCRIPTION OF THE INVENTION

A copolymer according to the invention is prepared by copolymerization of a carboxyl-containing macromonomer (a), a specific macromonomer (b) and other polymerizable unsaturated monomeric component (c), which are hereafter explained.

Carboxyl-containing Polymerizable Unsaturated Macromonomer (a):

The carboxyl-containing, polymerizable unsaturated macromonomer, which serves as the component (a) constituting a copolymer of the present invention, has at least one carboxyl group and at least one polymerizable unsaturated bond per molecule. This monomeric component is useful when said copolymer of the invention is used for dispersing pigment, for effectively adsorbing the copolymer onto the pigment. Because the component (a) is in the form of a macromonomer, it can assist localization of the pigment-adsorbing component in the copolymer of the invention, whereby improving the adsorbing ability of the copolymer to the pigment and preventing re-aggromeration of the pigment, to improve stability of the pigment dispersion.

The carboxyl-containing, polymerizable unsaturated macromonomer (a) can be prepared by a production method known per se, for example, by a process comprising synthesizing in advance a vinyl polymer having a carboxyl precursor group which is convertible to a carboxyl group by a post-treatment, and treating the vinyl polymer to introduce thereinto a polymerizable, unsaturated group and convert the carboxyl precursor group to a carboxyl group. More specifically, for example a carboxyl-containing macromonomer can be prepared through the steps of copolymerizing a monomeric mixture of tert-butyl (meth)acrylate and other vinyl monomer using a carboxyl-containing chain transfer agent represented by 3-mercaptopropionic acid and if necessary a radical polymerization initiator, in the presence of an organic solvent, to form a copolymer with carboxyl group-terminated polymer chain; reacting the resulting copolymer with an epoxy-containing monomer such as glycidyl methacrylate to introduce a polymerizable double bond to the copolymer chain terminal; and then adding to said copolymer, into which said polymerizable double bond has been introduced, an acid catalyst such as p-toluenesulfonic acid and heating the system to decompose the tert-butyl ester group and convert it to carboxyl group.

In this specification, "(meth)acrylate" signifies "acrylate" or "methacrylate".

Such carboxyl-containing, polymerizable unsaturated macromonomer (a) normally conveniently has a number-average molecular weight within a range of 500–15,000, in particular, 600–10,000, for effective localization of pigment-adsorption groups and ease of production. The macromonomer (a) furthermore conveniently has an acid value within a range of 20–400 mgKOH/g, preferably 25–300 mgKOH/g, for improvement in dispersibility brought about by adsorption onto the pigment used and better solubility and moisture resistance of the macromonomer. The macromonomer (a) preferably is linear, and has a polymerizable double bond or bonds on at least one terminal, preferably at one terminal, of its polymer chain.

Polymerizable Unsaturated Macromonomer (b);

The polymerizable unsaturated macromonomer which serves as the component (b) constituting the copolymer of the present invention is at least one macromonomer selected from the group consisting of polyalkyl (meth)acrylate macromonomer and polystyrene macromonomer having a polymerizable unsaturated bond on at least one of the terminals of the polymer chain.

Said polyalkyl (meth)acrylate macromonomer has, as the main chain, a (co)polymer of an alkyl ester of acrylic acid or methacrylic acid such as methyl (meth)acrylate, ethyl (meth)acrylate, n-propyl (meth)acrylate, isopropyl (meth) acrylate, n-butyl (meth)acrylate, isobutyl (meth)acrylate, t-butyl (meth)acrylate, 2-ethylhexyl acrylate, n-octyl (meth) acrylate, lauryl (meth)acrylate, tridecyl (meth)acrylate, stearyl (meth)acrylate and the like; preferably (co)polymers of acrylic acid or methacrylic acid alkyl esters containing $C_1$–$C_{24}$ alkyl group.

Such a polyalkyl (meth)acrylate macromonomer can be prepared, for example, through the steps comprising copolymerizing an alkyl ester, or a mixture of alkyl esters, of acrylic acid or methacrylic acid as named above, using a carboxyl-containing chain transfer agent represented by 3-mercaptopropionic acid and if necessary a radical polymerization initiator, in the presence of an organic solvent, to form a copolymer having terminal carboxyl group or groups; and reacting the copolymer with an epoxy-containing, polymerizable unsaturated monomer such as glcidyl methacrylate, whereby introducing a polymerizable double bond or bonds to a terminal or both terminals of the copolymer chain by reacting the carboxyl group(s) with the epoxy group(s).

Said polystyrene macromonomer can be obtained, for example, through the steps of copolymerizing styrene using a carboxyl-containing chain transfer agent represented by 3-mercaptopropionic acid and, if necessary, a radical polymerization initiator, in the presence of an organic solvent, to form a carboxyl group-terminated copolymer; and reacting the same copolymer with an epoxy-containing polymerizable unsaturated monomer such as glycidyl methacrylate, whereby introducing a polymerizable double bond or bonds into the copolymer chain terminal or terminals by the reaction between the carboxyl group(s) and epoxy group(s).

In the copolymer according to the invention, the polymerizable unsaturated macromonomer (b) forms a steric repelling layer differently from aforesaid carboxyl-containing polymerizable unsaturated macromonomer (a) which is the pigment-adsorbing component, and functions to prevent reagglomeration of the pigment. It is normally preferred for the macromonomer (b) to have a number-average molecular weight within a range of 1,000–15,000, in particular, 1,200–10,000 for ready formation of said steric repelling layer, stability of the pigment dispersion containing the copolymer and easy preparation of the macromonomer (b).

Such macromonomers (b) are commercially available, examples of which include MACROMONOMER AA-6 (a polymethyl methacrylate with methacryloyl group-terminated polymer chain, having a number-average molecular weight of about 6,000), MACROMONOMER AW-6 (a polyisobutyl methacrylate with methacryloyl group-terminated polymer chain, having a number-average molecular weight of about 6,000), MACROMONOMER AB-6 (a polybutyl methacrylate with methacryloyl group-terminated polymer chain, having a number-average molecular weight of about 6,000) and MACROMONOMER AS-6 (a polystyrene with methacryloyl group-terminated polymer chain, having a number-average molecular weight of about 6,000), which are products of Toagosei Ltd.).

Other Polymerizable Unsaturated Monomer(s) (c):

Other polymerizable unsaturated monomer(s) (c) which constitute the copolymer of the present invention with said carboxyl-containing macromonomer (a) having a high polarity and the macromonomer (b) as the dispersion-stabilizing component having a relatively low polarity, are not subject to any critical limitation as to their kind, so long as they are copolymerizable with macromonomer (c) and/or macromonomer (b).

Examples of other polymerizable unsaturated monomer (c) include: $C_2$–$C_8$ hydroxyalkyl esters of acrylic or methacrylic acid, such as 2-hydroxyethyl (meth)acrylate, 2-hydroxypropyl (meth)acrylate, 3-hydroxypropyl (meth) acrylate and hydroxybutyl (meth)acrylate; monoesters of polyether polyols such as polyethylene glycol, polypropylene glycol and polybutylene glycol with polymerizable unsaturated carboxylic acids such as acrylic or methacrylic acid; adducts of hydroxyalkylvinyl ether, allyl alcohol, hydroxyalkyl ester of acrylic acid or methacrylic acid, (poly)alkyleneglycol mono(meth)acrylate or the like with lactones (e.g., ε-caprolactone, δ-valerolactone); monoethers of polyether polyols such as polyethylene glycol, polypropylene glycol and polybutylene glycol with hydroxyl-containing unsaturated monomers such as 2-hydroxyethyl (meth)acrylate; adducts of α,β-unsaturated carboxylic acid with monoepoxy compound such as Cardura E10 (Shell Chemical Co., Ltd.) and α-olefinepoxide; adducts of glycidyl (meth)acrylate and monobasic acid such as acetic acid, propionic acid, p-t-butylbenzoic acid and fatty acids; hydroxyl-containing unsaturated monomers such as hydroxyalkyl ethers like hydroxy-ethylvinyl ether, and hydroxyl-containing unsaturated monomer such as allyl alcohol; $C_2$–$C_{24}$ alkyl esters of acrylic acid or methacrylic acid such as ethyl (meth)acrylate, n-butyl (meth)acrylate, isobutyl (meth)acrylate, t-butyl (meth)acrylate, 2-ethylhexyl acrylate, n-octyl (meth)acrylate, lauryl (meth)acrylate, tridecyl (meth)acrylate and stearyl (meth)acrylate; $C_2$–$C_{18}$ alkoxyalkyl esters of acrylic acid or methacrylic acid such as methoxyethyl (meth)acrylate and methoxybutyl (meth)acrylate; vinyl ethers such as ethyl vinyl ether, n-propyl vinyl ether, hexyl vinyl ether, cyclopentyl vinyl-ether, cyclohexyl vinyl ether and phenyl vinyl ether; allyl ethers such as allyl ethyl ether; vinyl esters such as vinyl acetate, vinyl butyrate, vinyl pivalate and Veoba monomer (Shell Chemical Co., Ltd.); propenyl esters such as isopropenyl acetate and isopropenyl propionate; olefinic compounds such as ethylene, propylene and butylene; vinylaromatic compounds such as styrene, α-methylstyrene and vinyltoluene; (meth) acrylic acid esters of polyhydric alcohols such as ethylene glycol di(meth)acrylate, diethylene glycol di(meth)acrylate, 1,3-butylene di(meth)acrylate, 1,4-butanediol di(meth) acrylate, glycerine di(meth)acrylate, glycerine tri(meth) acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth) acrylate, neopentyl glycol di(meth)acrylate and 1,6-hexanediol di(meth)acrylate; diallylisophthalate and divinyl benzene. These monomers can be used either singly or in combination of two or more.

Copolymer:

A copolymer of the invention can be prepared by copolymerizing a carboxyl-containing, polymerizable unsaturated macromonomer (a) which is an adsorbing component to pigment, polymerizable unsaturated macromonomer (b) which contributes to dispersion stability, and other polymerizable unsaturated monomer(s) (c). The copolymerization ratio of these components are within the following ranges, respectively, based on 100 parts by weight in total of these components, the parts being by weight, component (a): 5–50 parts, preferably 10–45 parts, inter alia, 12–40 parts;

component (b): 30–70 parts, preferably 35–60 parts, inter alia, 38–58 parts;

component (c): 5–65 parts, preferably 5–55 parts, inter alia, 10–50 parts.

Copolymerization of above components (a), (b) and (c) can be normally performed by reacting them in an organic solvent and in the presence of about 0.01—about 10 parts by weight per 100 parts by weight in total of the components (a), (b) and (c) of a polymerization initiator, at a temperature within a range from about −20° C. to about 160° C. under normal or optionally under an elevated pressure up to about 30 kg/cm$^2$G. Useful organic solvent is not critical, so long as it can dissolve or disperse above components (a), (b) and (c) and the copolymer obtained upon copolymerization of these components. More specifically, examples of useful organic solvent include: aromatic solvents such as xylene and toluene; ketone solvents such as methyl ethyl ketone and methyl isobutyl ketone; ester solvents such as ethyl acetate, butyl acetate, isobutyl acetate and 3-methoxybutyl acetate; and alcoholic solvents such as n-butanol and isopropyl alcohol.

As the polymerization initiator, any of those known per se as being useful for polymerization of polymerizable unsaturated monomers can be used. Typical examples include azo-type polymerization initiators such as 2,2'-azobisisobutyronitrile, aozbis-2-methylbutyronitrile and azobisdivarelonitrile; and organic peroxide-type polymerization initiators such as t-butyl peroxyisobutylate, t-butyl peroxy-2-ethylhexanoate, t-amyl peroxy-3,5,5-trimethylhexanoate, t-tubylperoxyisopropylcarbonate and 2,2-bis(4,4-di-t-butyl peroxycyclohexyl)propane.

The so obtained copolymers are considered to take well balanced comb structure formed of the carboxyl-containing macromonomer (a) unit which is a high polarity pigment adsorbing component, the macromonomer (b) unit which is a relatively low polarity dispersion-stabilizing component, and other polymerizable unsaturated monomer (c) units.

The copolymers of the present invention generally have a number-average molecular weight within a range from 2,000–100,000, preferably 3,000–50,000; and a resin acid value within a range from 10–200 mgKOH/g, preferably 15–150 mgKOH/g, for favorable pigment dispersion stability and ease of handling.

Pigment Dispersions:

A pigment dispersion according to the invention comprises above-described copolymer of the invention serving as a pigment-dispersing resin, pigment, organic solvent and if necessary a dispersion promotor, and further if necessary other additives.

Examples of pigment contemplated in the invention include: inorganic pigments such as titanium dioxide, zinc oxide, iron oxide, calcium carbonate, barium sulfate, chrome yellow, clay, talc and carbon black; and various organic pigments such as azo-, diazo-, condensation azo-, thioindigo-, indanthrone-, anthraquinone-, benzoimidazolone-, phthalocyanine-, isoindolinone-, perylene-, quinacridone-, dioxane-, and diketopyrrolopyrrole-type pigments. The copolymers of the present invention exhibit particularly remarkable pigment-dispersing ability and pigment dispersion stability as pigment-dispersing resin for diketopyrrolopyrrole pigments.

The organic solvent in such a pigment dispersion is not subject to any limitation, but any which can dissolve or disperse the copolymer may be used. For example, those organic solvents which are useful in the occasion of the copolymer preparation may be used.

Examples of the dispersion promotors, which are used if necessary, include wetting agents and as examples of still other additives, defoaming agent can be named.

The pigment dispersions of the invention are obtained by dispersing the named starting components with pigment by a method known per se. Examples of dispersing means for obtaining a pigment dispersion of the invention include: roll mill, ball mill, sand grind mill DCP mill, LMZ mill, attriter and paint shaker.

The use rate of the copolymer of the invention in preparation of the pigment dispersion is not critical. Generally, however, it is convenient to use it within a range of 5–300, in particular, of 10–200, parts per 100 parts of the pigment to be dispersed, parts being by weight.

Paint Composition:

A pigment dispersion according to the invention can be blended with a binder resin for paint and if necessary with such additives as organic solvent, polymer fine particles, curing catalyst, ultraviolet absorber, ultraviolet stabilizer, paint film surface regulating agent, antioxidant, flow property regulator and silan coupling agent, to form a pigment composition.

The binder resin for paint as referred to herein include substrate resins normally used in paint and combinations of such substrate resins with curing agents. Examples of substrate resins include hydroxyl-containing acrylic resin, hydroxyl-containing polyester resin, epoxy resin, epoxy-containing acrylic resin, carboxyl-containing high acid value polyester resin and carboxyl-containing high acid value acrylic resin, which can be used either singly or in combination. Examples of useful curing agent include amino resin and optionally blocked polyisocyanate resin.

As the binder resin for paint, combination of at least one substrate resin selected from hydroxyl-containing acrylic resins and hydroxyl-containing polyester resins with at least one curing agent selected from amino resins and optionally blocked polyisocyanate compounds; and combination of at least one resin selected from epoxy resins and epoxy-containing acrylic resins with at least one carboxyl-containing resin selected from high acid value ester resins and high acid value acrylic resins, can be conveniently used.

As organic solvent which may be used when necessity arises, various organic solvents such as those named as being useful in production of the copolymers can be used.

Said polymer fine particles are of a polymer which scatters as solid fine particles in the paint composition of the invention, not being dissolved. Such polymer fine particles are know per se, which conveniently possess an average particle size within a range of 0.01–1 m$\mu$. While cross-linking inside said polymer fine particles is not essential, presence of internal crosslinkages is preferred.

As said curing catalyst, dibutyltin diacetate, dibutyltin dioctate, dibutyltin dilaurate, triethylamine and diethanolamine may be named, for example, where the curing agent is an optionally blocked polyisocyanate compound. Whereas, when an amino resin such as melamine resin is used as the curing agent, sulfonic acid compounds such as paratoluenesulfonic acid, dodecylbenzenesulfonic acid and dinonylnaphthalenesulfonic acid or amine-neutralization products of these sulfonic acid compounds can be used.

Examples of the ultraviolet absorbing agents include benzophenone, benzotriazole, cyanoacrylate, salicylate and oxanilide compounds. Also as examples of ultraviolet stabilizer, hindered amine compounds can be named.

The paint compositions of the invention are usefil in the field where coloring paint is applied. They can be conveniently used, for example, as top coating and coloring paint in 1-top coat finishing; as coloring base paint in 2-top coat finishing consisting of coloring base—clear top coating (including both 2-coat-1-bake finish and 2-coat-2-bake finish); and as coloring base paint in 3-top coat finishing (including all of 3-coat-1-bake finish, 3-coat-2-bake finish and 3-coat-3-bake finish).

EXAMPLES

Hereinafter the invention is more specifically explained, referring to working examples, it being understood that the invention is in no way thereby limited. In the following examples, parts and percentages are by weight.

Synthesis of the Carboxyl-containing Macromonomer Synthesis Example 1

A flask equipped with a stirrer, condenser, thermometer, nitrogen inlet pipe and a dropping device was charged with 100 parts of methoxypropyl acetate, into which 60 parts of methyl methacrylate and 40 parts of tert.-butyl methacrylate were dropwisely added under passing of a gaseous nitrogen stream at a polymerization temperature of 100° C. , to perform radical polymerization using 2 parts of 2,2'-azobisisobutyronitrile (hereafter may be abbreviated as "AIBN") and 7.7 parts of 3-mercaptopropionic acid. To the obtained solution of the terminal carboxyl-containing polymer, 1 part of tetrabutyl-phosphonium bromide, 0.1 part of hydroquinone monomethyl ether and 8.8 parts of glycidyl methacrylate were added, following by a reaction at 90° C. for 6 hours, introducing to an end of the polymer chain a polymerizable double bond. One (1) part of p-toluenesulfonic acid was added to this solution and heated at 120° C. for 5 hours, whereupon tert.-butyl ester groups were decomposed and converted to carboxyl groups. Thus a 50% solid solution (a-1) of the carboxyl-containing macromonomer was obtained. The macromonomer had an acid value of 160 mgKOH/g, a styrene-converted number-average molecular weight (styrene-converted number-average molecular-weight calculated on "GPC", gel permeation chromatography: which applies to all hereafter appearing styrene converted number average molecular weight) of 1,500.

Synthesis Example 2

Synthesis Example 1 was repeated except that the amount of the methyl methacrylate was changed to 64 parts and that of the tert.-butyl methacrylate, to 60 parts, and a 50% solid solution (a-2) of the carboxyl-containing macromonomer was obtained. The macromonomer had an acid value of 200 mgKOH/g and a styrene-converted number-average molecular weight of 1,300.

Preparation of the Copolymer

Example 1

In a flask equipped with a stirrer, condenser, thermometer, nitrogen inlet pipe and a dropping device, 84 parts of propylene glycol monomethyl ether, 32 parts of the 50% solid solution (a-1) of carboxyl-containing macromonomer which was obtained in Synthesis Example 1 (16 parts in terms of the solid content), and 100 parts of AW-6S (Toagosei Ltd., a solution of a macromonomer which is polyisobutyl methacrylate containing methacryloyl groups at the chain ends, 50% solid; styrene converted number average molecular weight of the macromonomer=6,000) (50 parts in terms of the solid content) were blended, heated to 100° C. and maintained at said temperature. While passing a nitrogen gaseous current, a mixture of 24 parts of methyl methacrylate, 10 parts of styrene and 1 part of AIBN was dropwisely added into the same flask over 4 hours, and thereafter further 0.5 part of AIBN was added, followed by 2 hours' reaction at the same temperature. Thus a copolymer solution (R-1) containing 40% of non-volatile component having an acid value of 25 mgKOH/g and a styrene converted number-average molecular weight of 7,000 was obtained.

Examples 2–7

Copolymer solutions (R-2)–(R-7) were prepared by the same method as practiced in Example 1, except that the kind of mocromonomer and the monomeric blend ratio were varied for each run as shown in Table 1.

Comparative Example 1

In a flask equipped with a stirrer, condenser, thermometer, nitrogen inlet pipe and a dropping device, 100 parts of propylene glycol monomethyl ether and 100 parts of AW-6S (solid content 50 parts) were blended, heated to 100° C. and maintained at said temperature. While passing a nitrogen gaseous current, a mixture of 30 parts of methyl methacrylate, 20 parts of styrene and 1 part of AIBN was dropwisely added into the flask over a period of 4 hours. After the dropping was completed, 0.5 part of AIBN was added, followed by further 2 hours' reaction at the same temperature. Thus a resin solution (C-1) having a non-volatile component content of 40% and a styrene-converted number-average molecular weight of 7,800 was obtained.

Comparative Example 2

Into a flask equipped with a stirrer, condenser, thermometer, nitrogen inlet pipe and a dropping device, 134 parts of propylene glycol monomethyl ether and 32 parts (solid content: 16 parts) of the 50% solid, carboxyl-containing macromonomer solution (a-1) as obtained in Synthesis Example 1 were placed, and into which a mixture of 34 parts of methyl methacrylate, 50 parts of isobutyl methacrylate and 1 part of AIBN was added dropwisely over a period of 4 hours. After the dropping was completed, 0.5 part of AIBN was added, followed by further 2 hours' reaction at the same temperature. Thus a resin solution (C-2) having a non-volatile component content of 40%, an acid value of 25 mgKOH/g, and a styrene converted number-average molecular weight of 5,500 was obtained.

Comparative Example 3

A flask equipped with a stirrer, condenser, thermometer, nitrogen inlet pipe and a dropping device was charged with 100 parts of propylene glycol monomethyl ether and 100 parts (solid content: 50 parts) of AW-6S, and to which a mixture of 4 parts of methacrylic acid, 16 parts of styrene, 30 parts of methyl methacrylate and 1 part of AIBN was added dropwise over a period of 4 hours. After termination of the dropwise addition, further 0.5 part of AIBN was added, followed by 2 hours' reaction at the same temperature, to provide a resin solution (C-3) having a non-volatile component content of 40%, an acid value of 26 mgKOH/g and a styrene converted number-average molecular weight of about 8,400.

Preparation of Pigment Dispersions

Example 8

Two-hundred-and-fifty (250) parts of the 40% copolymer solution (R-1) which was obtained in Example 1, 310 parts of propylene glycol monomethyl ether acetate, 80 parts of Rubin TR (Ciba Specialty Chemicals Co., Ltd., a diketopyrrolopyrrole pigment) as the pigment to be dispersed, and 130 parts of glass beads were mixed, and dispersed in a paint shaker for 4 hours to provide a pigment dispersion (P-1).

Examples 9–16 and Comparative Examples 4–7

Example 8 was repeated except that the copolymer solution, propylene glycol monomethyl ether acetate and pigment constituting the blend were varied for each example as indicated in later appearing Table 2, to form pigment dispersions (P-2) to (P-9) (working examples of the invention) and (P-10) to (P-13) (comparative examples).

Viscosity, coated film gloss and transparency of those pigment dispersions which were obtained in above Examples 8–16 and Comparative Examples 4–7 were measured using the following test methods. The results are given in the later appearing Table 2.

Test Methods

Viscosity: Viscosity (mPa·s) of each pigment dispersion whose temperature was adjusted to 20° C. was measured at a shear-speed of $100s^{-1}$, with rotating type dynamic viscoclasticity measuring apparatus (MR 300; marketed by UBM Co., Ltd.).

Coated film gloss: Each pigment dispersion was applied onto a PET film with a doctor blade (5 mils) and dried. Gloss of the dry, coated film was measured in accordance with the procedure prescribed by JIS K5400 7.6.

Tansparency: Each pigment dispersion was applied onto a PET film with a doctor blade (5 mils) and dried. Transparency of the dry, coated film was evaluated in terms of percent (%) light transmission following the equation below, using a turbidimeter (COH-300).

Light transmission (%)=100×[1−(diffused light intensity)/(irradiated light intensity)]

TABLE 1

|  |  | Examples |  |  |  |  |  |  | Comparative Examples |  |  |
| --- | --- | --- | --- | --- | --- | --- | --- | --- | --- | --- | --- |
| Example No. |  | 1 | 2 | 3 | 4 | 5 | 6 | 7 | 1 | 2 | 3 |
| Copolymer solution |  | R-1 | R-2 | R-3 | R-4 | R-5 | R-6 | R-7 | C-1 | C-2 | C-3 |
| Carboxyl-containing | kind | a-1 | a-1 | a-2 | a-2 | a-2 | a-1 | a-2 |  | a-1 |  |
| macromonomer | amount (part) | 32 | 48 | 20 | 40 | 40 | 32 | 20 |  | 32 |  |
| AW-6S |  | 100 | 100 | 100 | 100 | 100 |  |  | 100 |  | 100 |
| AA-6 (*1) |  |  |  |  |  |  | 111 | 111 |  |  |  |
| Methyl methacrylate |  | 24 | 16 | 30 | 20 | 20 |  |  | 30 | 34 | 30 |
| Isobutyl methacrylate |  |  |  |  |  |  | 34 | 30 |  | 50 |  |
| Styrene |  | 10 | 10 | 10 | 10 |  |  | 10 | 20 |  | 16 |
| 2-Hydroxyethyl acrylate |  |  |  |  |  | 10 |  |  |  |  |  |
| Methacrylic acid |  |  |  |  |  |  |  |  |  |  | 4 |
| Propylene glycol monomethyl ether |  | 84 | 76 | 90 | 80 | 80 | 73 | 79 | 100 | 134 | 100 |
| Acid value of resin (mgKOH/g) |  | 25 | 38 | 23 | 40 | 40 | 25 | 23 | 0 | 25 | 26 |
| Molecular weight (Mn) |  | 7000 | 6800 | 7800 | 5600 | 5600 | 7200 | 7600 | 7800 | 5500 | 8400 |

(*1) AA-6: a solution of polymethylmethacrylate containing terminal methacryloyl groups. Toagosei Ltd., solid content about 45%, styrene converted number-average molecular weight of the macromonomer about 6,000.

TABLE 2

| | Examples | | | | | | | | | Comparative Examples | | | |
|---|---|---|---|---|---|---|---|---|---|---|---|---|---|
| Example No. | 8 | 9 | 10 | 11 | 12 | 13 | 14 | 15 | 16 | 4 | 5 | 6 | 7 |
| Dispersion | P-1 | P-2 | P-3 | P-4 | P-5 | P-6 | P-7 | P-8 | P-9 | P-10 | P-11 | P-12 | P-13 |
| Dispersed resin kind | R-1 | R-2 | R-3 | R-4 | R-5 | R-6 | R-7 | R-1 | R-2 | C-1 | C-1 | C-2 | C-3 |
| Dispersed resin amount (part) | 250 | 250 | 250 | 250 | 250 | 250 | 250 | 250 | 250 | 250 | 250 | 250 | 250 |
| Propylene glycol monomethyl ether acetate | 310 | 310 | 310 | 310 | 310 | 310 | 310 | 310 | 310 | 310 | 310 | 310 | 310 |
| Pigment kind | | | | Rubin TR | | | | DPP-80 | | Rubin TR | DPP-80 | Rubin TR | |
| Pigment amount (part) | 80 | 80 | 80 | 80 | 80 | 80 | 80 | 80 | 80 | 80 | 80 | 80 | 80 |
| Viscosity (mPa · s) | 810 | 620 | 650 | 480 | 550 | 720 | 680 | 80 | 70 | not dischargeable | 130 | 2500 | 1000 |
| Gloss (60° gloss) | 100 | 105 | 100 | 110 | 110 | 108 | 100 | 86 | 88 | | 62 | 100 | 80 |
| Transparency (%) | 91 | 92 | 88 | 91 | 88 | 92 | 90 | — | — | | — | 90 | 76 |

Preparation of resin for paint

Production Example 1

An acrylic resin reaction vessel equipped with a stirrer, thermometer and reflux condenser was charged with 30 parts of Swasol 1000 (Cosmo Oil Co., Ltd., an aromatic hydrocarbon solvent) and 5 parts of n-butyl alcohol which were then heated under stirring. When the temperature of the system reached 130° C., a mixture comprising the following monomers was added dropwise over a period of 3 hours:

| | Parts |
|---|---|
| styrene | 20 |
| methyl methacrylate | 50 |
| n-butyl acrylate | 15 |
| 2-hydroxyethyl methacrylate | 15 |
| 2,2'-azobisisobutyronitrile | 5 |
| n-butyl alcohol | 5 |

After the dropwise addition of said mixture was terminated, the system was maintained at 130° C. for further 30 minutes, and then into which a supplemental catalyst solution which was a mixture of 0.5 part of 2,2'-azobisisobutyronitrile and 8 parts of Swasol 1000 was added dropwise over a period of an hour, followed by another hour's continued stirring at 130° C. and subsequent cooling. Eight (8) parts of n-butyl alcohol was added to dilute the product, to provide an acrylic polymer solution (AP-1) having a solid concentration of 60%. Thus obtained acrylic polymer had a glass transition temperature of 60° C. and a hydroxyl value of 65 mgKOH/g.

Preparation of coloring paint composition

Example 17

Eighty (80) parts of the pigment dispersion (P-1) which was obtained in Example 8, 92.5 parts of acrylic polymer solution (AP-1, solid content 55.5 parts) obtained in Production Example 1, 45.7 parts (32 parts in terms of solid) of Nikalac™ MS25 (Sanwa Chemical Co., Ltd., a butyl etherified melamine resin solution having a solid content about 70%), 2 parts of Nacure™ 5225 (King Industries, Inc., U.S.A., a curing catalyst solution which is a solution of amine neutralization product of a sulfonic acid compound, effective component 25%) and 1 part of Disparlon LC-955™ (Kusumoto Chemicals, Ltd. a surface regulating agent) were mixed to provide a coloring paint composition.

Examples 18–25 and Comparative Examples 8–10

Coloring paint compositions were prepared similarly to Example 17, with the blended components varied as shown in later appearing Table 3.

Using the coloring paint compositions which were obtained in Examples 17–25 and Comparative Examples 8–10, painted test sample panels were prepared following the method described hereunder.

Method for Preparing Painted Panels as Test Samples

Onto a 0.8 mm-thick cold stretched dull steel plate which had been given a zinc phosphate forming treatment, an epoxy resin type cationic electrodeposition paint was electrodeposited to a dry film thickness of about 20 μm and baked. Onto the electrodeposited and baked paint film, a polyester resin-type inter coat for automobiles was applied to a dry film thickness of about 20 μm and baked. Thus painted sample was given wet sanding with #400 sand paper, dried-off and degreased with petroleum benzine. Each of above coloring paint compositions was adjusted of its viscosity to 15 seconds (Ford cup #4, 25° C.) and applied onto the degreased surface to a dry film thickness of about 35 μm, with an air spray gun WIDER W71 (Anest Iwata Corporation) and baked at 140° C. for 30 minutes with an electric hot air dryer, to provide a test painted panel.

These painted panels were subjected to various tests conducted by the following methods, with the results as shown in Table 3.

Test Methods

Appearance of the Top Coat Film:

Finished appearance of top coat film was synthetically observed in respect of gloss, smoothness and voluminous feeling, and evaluated in three grades as follows:

○: good, Δ: poor, X: very poor.

Intimate Adhesion:

Following JIS K-5400 8.5, 2 (1990) gridiron pattern tape method, each eleven parallel straight lines were orthogonally drawn vertically and horizontally at 1 mm intervals on the top coat film surface on each test panel, to form one hundred 1 mm×1 mm crosses. Onto the same surface cellophane adhesive tape was applied intimately. The tape was then rapidly peeled off and the extent of peeling of the crosses was observed. Evaluation of adhesion was given by a three-grade system as follows:

○: at least 90 crosses of the coat film remained unpeeled;

Δ: the coat film was peeled off, no less than 50 but less than 90 crosses remaining unpeeled;

X: the coat film peeled off, less than 50 crosses remaining unpeeled.

Waterproofness:

Test panels were immersed in 40° C. constant temperature bath for 240 hours. After withdrawal from the bath, the panels free of any abnormality such as gloss deterioration and swelling were evaluated as ○ (good), and those exhibited such abnormalities, as X (poor).

Impact Resistance:

Following JIS K-5400 8.3, 2 (1990) DuPont impact resistance test, the test was conducted under the conditions of using a weight of 500 g with its hitting front end having a diameter of about 12.7 mm, and the coated film surface of the test sample facing upward, to determine the maximum dropping distance of the weight without damaging the coated film. The evaluation was given in three grade system according to the following standard:

○: the maximum dropping distance of the weight was at least 50 cm

Δ: the maximum dropping distance of the weight was no less than 30 cm but less than 50 cm X: the maximum dropping distance of the weight was less than 30 cm.

TABLE 3

| | | Examples | | | | | | | | | Comparative Examples | | |
|---|---|---|---|---|---|---|---|---|---|---|---|---|---|
| Example No. | | 17 | 18 | 19 | 20 | 21 | 22 | 23 | 24 | 25 | 8 | 9 | 10 |
| Pigment | kind | P-1 | P-2 | P-3 | P-4 | P-5 | P-6 | P-7 | P-8 | P-9 | P-11 | P-12 | P-13 |
| dispersion | amount (part) | 80 | 80 | 80 | 80 | 80 | 80 | 80 | 80 | 80 | 80 | 80 | 80 |
| Acrylic polymer solution AP-1 | | 92.5 | 92.5 | 92.5 | 92.5 | 92.5 | 92.5 | 92.5 | 92.5 | 92.5 | 92.5 | 92.5 | 92.5 |
| Nikalac MS25 | | 46 | 46 | 46 | 46 | 46 | 46 | 46 | 46 | 46 | 46 | 45.7 | 45.7 |
| Nacure 5225 | | 2.0 | 2.0 | 2.0 | 2.0 | 2.0 | 2.0 | 2.0 | 2.0 | 2.0 | 2.0 | 2.0 | 2.0 |
| Disparlon LC-955 | | 1.0 | 1.0 | 1.0 | 1.0 | 1.0 | 1.0 | 1.0 | 1.0 | 1.0 | 1.0 | 1.0 | 1.0 |
| Test result | coated film appearance | ○ | ○ | ○ | ○ | ○ | ○ | ○ | ○ | ○ | X | X | X |
| | intimate adhesion | ○ | ○ | ○ | ○ | ○ | ○ | ○ | ○ | ○ | X | Δ | Δ |
| | water resistance | ○ | ○ | ○ | ○ | ○ | ○ | ○ | ○ | ○ | ○ | ○ | X |
| | impact resistance | ○ | ○ | ○ | ○ | ○ | ○ | ○ | ○ | ○ | ○ | ○ | Δ |

As has been described, the copolymers of the present invention strongly adsorb onto pigment surfaces by the action of component (a) constituent and inhibit agglomeration of pigment particles by the action of component (b) constituent. Hence they excel in pigment dispersibility, exhibiting superior dispersibility also of difficulty dispersing pigments such as diketopyrrolopyrrole and diketopyrrolopyrrole derivatives.

Again those pigment dispersions according to the invention which are prepared using the copolymers of the invention exhibit excellent color developing property, can have lowered viscosity and excel in dispersion stability and storage stability.

Those paint compositions prepared using the pigment dispersions of the present invention show favorable coat film appearance and can give coat film of excellent physical properties.

What is claimed is:

1. A copolymer which is characterized in that said copolymer is obtained through copolymerization of
   (a) carboxyl-containing, polymerizable unsaturated macromonomer 5–50 parts by weight,
   (b) at least one polymerizable unsaturated macromonomer selected from polyalkyl (meth)acrylate macromonomers and polystyrene macromonomers 30–70 parts by weight, and
   (c) at least one other polymerizable unsaturated monomer which is co-polymerizable with above (a) and/or (b) component 5–65 parts by weight, said copolymer having a number average molecular weight within a range of 2,000–100,000 and a resin acid value within a range of 10–200 mgKOH/g.

2. A copolymer according to claim 1, in which the macromonomer (a) has a number-average molecular weight within a range of 500–15,000 and an acid value within a range of 20–400 mgKOH/g.

3. A copolymer according to claim 1, in which the macromonomer (a) has a number-average molecular weight within a range of 600–10,000.

4. A copolymer according to claim 1, in which the macromonomer (a) has an acid value within a range of 25–300 mgKOH/g.

5. A copolymer according to claim 1, in which the macromonomer (a) has one polymerizable unsaturated bond at its molecular chain terminal.

6. A copolymer according to claim 1, in which the macromonomer (b) has a number-average molecular weight within a range of 1,000–15,000.

7. A copolymer according to claim 1, in which the macromonomer (b) has a number-average molecular weight within a range of 1,200–10,000.

8. A copolymer according to claim 1, which is obtained by copolymerizing 10–45 parts by weight of the macromonomer (a), 35–60 parts by weight of the macromonomer (b) and 5–55 parts by weight of other polymerizable unsaturated monomer(s).

9. A copolymer according to claim 1, which has a number-average molecular weight within a range of 3,000–50,000.

10. A copolymer according to claim 1, which has a resin acid value within a range of 15–150.

11. A pigment dispersion which contains the copolymer as described in claim 1, pigment, organic solvent and if necessary a dispersion promotor.

12. A pigment-dispersion according to claim 11, which contains the copolymer as described in claim 1 at a rate within a range of 5–300 parts by weight per 100 parts by weight of the pigment.

13. A pigment dispersion according to claim 11, which comprises at least one pigment selected from the group consisting of the diketopyrrolopyrrole and diketopyrrolopyrrole derivatives.

14. A pigment composition containing a pigment dispersion as described in claim 11.

* * * * *